United States Patent
Schmidt et al.

(10) Patent No.: US 12,084,347 B2
(45) Date of Patent: Sep. 10, 2024

(54) PROCESS AND PLANT FOR PRODUCING HYDROGEN AND FOR SEPARATING CARBON DIOXIDE FROM SYNTHESIS GAS

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Matthias Linicus, Eppstein (DE)

(73) Assignee: L'Air Liquide, Societe Anonyme Pour l'Etude et l'Exploitation des Procedes Georges Claude, Paris (FR)

(*) Notice: Subject to any disclaimer, the term of this patent is extended or adjusted under 35 U.S.C. 154(b) by 208 days.

(21) Appl. No.: 17/524,047

(22) Filed: Nov. 11, 2021

(65) Prior Publication Data

US 2022/0144634 A1    May 12, 2022

(30) Foreign Application Priority Data

Nov. 11, 2020  (EP) .................................. 20020522

(51) Int. Cl.
C01B 3/52        (2006.01)
B01D 53/00       (2006.01)
(Continued)

(52) U.S. Cl.
CPC .............. *C01B 3/52* (2013.01); *B01D 53/002* (2013.01); *B01D 53/047* (2013.01);
(Continued)

(58) Field of Classification Search
None
See application file for complete search history.

(56) References Cited

U.S. PATENT DOCUMENTS

2005/0172807 A1    8/2005  Mak
2008/0223214 A1    9/2008  Palamara et al.
(Continued)

FOREIGN PATENT DOCUMENTS

EP    1 804 956    11/2013
EP    2 683 465     5/2018
(Continued)

OTHER PUBLICATIONS

European Search Report for corresponding EP 20020522.7, May 10, 2021.

*Primary Examiner* — Gabriel E Gitman
(74) *Attorney, Agent, or Firm* — Elwood L. Haynes (57) ABSTRACT

The present invention relates to a process for producing hydrogen and for separating carbon dioxide from synthesis gas using a physical absorption medium. The process comprises the steps where the synthesis gas and the absorption medium are cooled; carbon dioxide is removed from the cooled synthesis gas via the cooled absorption medium in a physical absorption step at elevated pressure; laden absorption medium is treated in a plurality of flash stages, wherein co-absorbed carbon monoxide, hydrogen and carbon dioxide are separately removed from the laden absorption medium; hydrogen is separated from synthesis gas freed of carbon dioxide in a physical separation step, wherein hydrogen as product gas and an offgas comprising hydrogen, carbon monoxide and carbon dioxide are obtained; product gas hydrogen and carbon dioxide are discharged from the process. The invention further relates to a plant for performing the process.

19 Claims, 1 Drawing Sheet

(51) Int. Cl.
*B01D 53/047* (2006.01)
*B01D 53/14* (2006.01)
*B01D 53/26* (2006.01)
*C01B 3/56* (2006.01)
*C10K 1/00* (2006.01)
*C10K 1/16* (2006.01)
*C10K 3/04* (2006.01)

(52) U.S. Cl.
CPC ..... *B01D 53/1418* (2013.01); *B01D 53/1425* (2013.01); *B01D 53/1475* (2013.01); *B01D 53/263* (2013.01); *B01D 53/265* (2013.01); *C01B 3/56* (2013.01); *C10K 1/005* (2013.01); *C10K 1/16* (2013.01); *B01D 53/1493* (2013.01); *B01D 2252/2021* (2013.01); *B01D 2252/20468* (2013.01); *B01D 2252/20473* (2013.01); *B01D 2256/16* (2013.01); *C01B 2203/0283* (2013.01); *C01B 2203/0415* (2013.01); *C01B 2203/042* (2013.01); *C01B 2203/0475* (2013.01); *C01B 2203/0495* (2013.01); *C01B 2203/0833* (2013.01); *C01B 2203/0883* (2013.01); *C01B 2203/146* (2013.01); *C10K 3/04* (2013.01); *Y02C 20/40* (2020.08)

(56) References Cited

U.S. PATENT DOCUMENTS

| | | |
|---|---|---|
| 2011/0203314 A1 | 8/2011 | Mak |
| 2012/0073441 A1 | 3/2012 | Mak |
| 2018/0326348 A1* | 11/2018 | Tanna ............... C10K 1/004 |
| 2020/0075981 A1 | 3/2020 | Jahnke et al. |
| 2020/0231435 A1* | 7/2020 | Zhou ..................... C01B 3/36 |
| 2021/0269728 A1* | 9/2021 | Gubrinski .......... B01D 53/1406 |
| 2021/0402347 A1 | 12/2021 | Szabo et al. |

FOREIGN PATENT DOCUMENTS

| | | |
|---|---|---|
| EP | 3 362 406 | 7/2019 |
| WO | WO2012075000 | 6/2012 |

* cited by examiner

PROCESS AND PLANT FOR PRODUCING HYDROGEN AND FOR SEPARATING CARBON DIOXIDE FROM SYNTHESIS GAS

CROSS REFERENCE TO RELATED APPLICATIONS

This application claims priority to European Patent Application No. EP 20020522.7, filed Nov. 11, 2020, the entire contents of which are incorporated herein by reference.

BACKGROUND

Field of the Invention

The invention relates to a process for producing hydrogen and for separating carbon dioxide from synthesis gas. The invention further relates to a plant for producing hydrogen and for separating carbon dioxide from synthesis gas.

Prior Art

Producing hydrogen on the basis of fossil inputs often comprises a reforming step for synthesis gas production from a gaseous fossil input such as natural gas, a water gas shift unit for increasing hydrogen yield and a hydrogen purification stage based on a pressure swing adsorption (PSA). Typical reforming steps are reforming of natural gas with steam (steam methane reforming—SMR), autothermal reforming (ATR), partial oxidation (POx), combinations thereof or gas-heated reforming (GHR).

Each of the recited reforming steps and especially the water gas shift reaction generates carbon dioxide ($CO_2$) as a byproduct. To avoid $CO_2$ emissions this carbon dioxide should be separated from the process as efficiently as possible and subsequently sent either to long-term storage (carbon capture and storage—CCS) or to a further utilization (carbon capture and utilization—CCU).

Carbon dioxide separation may employ for example gas scrubbing processes in which solvents chemically bind the gas to be separated (chemical absorption). Such a process is described for example in EP 3 362 406. The solvents used for chemical absorption are in most cases aqueous solutions of amines or amino alcohols, for example methyldiethanolamine (MDEA). Due to the strong chemical bond between the basic amine/amino alcohol and the acidic target molecule carbon dioxide, a great deal of energy is required to regenerate the solvent, i.e. to free the solvent of chemically bonded carbon dioxide again.

EP 2 683 465 describes a process for separating carbon dioxide which combines a physical gas scrubbing with subsequent condensation of carbon dioxide. For condensation of the carbon dioxide a carbon dioxide-rich gas is cooled and compressed in several steps until the triple point is reached. The liquefied carbon dioxide stream may subsequently be separated from the remaining gases. The cooling and compression of the carbon dioxide down to the triple point to separate the carbon dioxide from the remaining gases requires complex apparatus and is associated with high energy requirements.

EP 1 804 956 discloses a process for recovery of dry carbon dioxide in high purity from a hydrogen production process. In this process a pressurized carbon dioxide-rich gas from a hydrogen recovery stage is initially cooled before carbon dioxide is condensed. The remaining carbon dioxide is subsequently removed by physical absorption in methanol. The carbon dioxide-laden methanol is regenerated by stepwise pressure reduction and recycled to an absorber. The disadvantage of this process is in turn that the majority of the carbon dioxide must be separated from the remaining gases by condensation which is energy intensive and requires complex apparatus.

SUMMARY

It is a general object of the present invention to overcome the abovementioned disadvantages of the prior art.

It is especially an object of the present invention to propose a process which makes it possible to separate the majority of the carbon dioxide generated during hydrogen production as a high purity carbon dioxide product.

The energy requirements are to be reduced as far as possible. In particular, the process should not comprise a mandatory technical step for separating carbon dioxide by liquefaction since liquefaction of carbon dioxide by repeated compression and cooling is associated with high energy requirements and high apparatus complexity.

It is a further object of the present invention to propose a plant which at least partially achieves at least one of the abovementioned objects.

The independent claims make a contribution to the at least partial achievement of at least one of the above objects. The dependent claims provide preferred embodiments which contribute to the at least partial achievement of at least one of the objects. Preferred embodiments of constituents of one category according to the invention are, where relevant, likewise preferred for identically named or corresponding constituents of a respective other category according to the invention.

The terms "having", "comprising" or "containing", etc., do not preclude the possible presence of further elements, ingredients, etc. The indefinite article "a" does not preclude the possible presence of a plurality.

The invention relates to a process for producing hydrogen from synthesis gas. The process further comprises the separation of carbon dioxide from this synthesis gas.

The objects of the invention are at least partially achieved by a process for producing hydrogen ($H_2$) and for separating carbon dioxide from synthesis gas, comprising the process steps of:
 (a) providing synthesis gas, wherein the synthesis gas comprises at least hydrogen ($H_2$), carbon monoxide (CO) and carbon dioxide ($CO_2$);
 (b) providing a physical absorption medium;
 (c) cooling the synthesis gas and the absorption medium;
 (d) removing carbon dioxide from the cooled synthesis gas via the cooled absorption medium in a physical absorption step at elevated pressure, wherein the cooled synthesis gas and the cooled absorption medium are run in counter-current, wherein synthesis gas at least partially freed of carbon dioxide is obtained and absorption medium laden with carbon dioxide and partially co-absorbed carbon monoxide and hydrogen is obtained;
 (e) treating the laden absorption medium in a plurality of serially arranged flash stages, wherein co-absorbed carbon monoxide and hydrogen is removed from the laden absorption medium in at least one first flash stage and carbon dioxide is removed from the laden absorption medium in a flash stage arranged downstream of the first flash stage;
 (f) separating hydrogen from the synthesis gas at least partially freed of carbon dioxide in a physical separation step, wherein hydrogen as product gas and an offgas comprising hydrogen, carbon monoxide and carbon dioxide are obtained;

(g) compressing to absorption pressure and at least partially recycling to step (d) the offgas obtained in step (f) and the carbon monoxide and hydrogen obtained in step (e);

(h) discharging the product gas (hydrogen) obtained in step (f) and the carbon dioxide obtained in step (e) from the process.

The abovementioned steps (a) to (h) need not necessarily be performed in the recited sequence.

The process according to the invention has the particular feature not only that value gases co-absorbed in absorption step (d) such as hydrogen and carbon monoxide are after their desorption in an at least first flash stage according to step (e) recycled to step (d) but also that the offgas obtained in step (g) which contains significant amounts of value gases (hydrogen and carbon monoxide) and carbon dioxide is recycled to step (d). This combination according to step (g) maximizes the hydrogen yield over all process steps. The amount of separated carbon dioxide is also maximized while simultaneously obtaining a carbon dioxide product of high purity.

In step (g) a sub-amount or the total amount of the offgas obtained in step (f) is recycled to step (d). In step (g) a sub-amount or the total amount of the carbon monoxide and hydrogen obtained in step (e) is recycled to step (d), preferably the total amount is recycled to step (d).

The use of a physical absorption medium allows regeneration thereof after the absorption of carbon dioxide by a simple, energy-unintensive flash step. Necessarily and unavoidably co-absorbed value gases (hydrogen, carbon monoxide) are removed from the absorption medium in at least one first flash stage. The thus partially regenerated absorption medium is supplied to a flash stage arranged downstream of the first flash stage. At this juncture the laden absorption medium contains predominantly carbon dioxide as the absorbed gas component. The gas desorbed in the downstream flash stage thus contains virtually exclusively carbon dioxide.

"Flashing", a "flash step" or a "flash stage" is understood by a person skilled in the art as meaning the regeneration of the absorption medium, i.e. desorption of physically bonded gases from the absorption medium, by pressure reduction.

The absorption of carbon dioxide in a physical absorption medium and subsequent regeneration by pressure reduction is sufficient to achieve high carbon dioxide separation rates from the synthesis gas. In particular this procedure is sufficient to achieve high carbon dioxide separation rates from a hydrogen-rich synthesis gas. A hydrogen-rich synthesis gas is in particular obtained from conventionally produced synthesis gas through a water gas shift (WGS).

A "physical absorption medium" is to be understood as meaning an absorption medium where the solubility of the absorbed gases in the absorption medium is brought about by physical interactions. In particular the absorption in the physical absorption medium is not brought about by chemical interactions such as for example an acid-base interaction, in particular an interaction in the sense of a bond of a Lewis acid to a Lewis base.

Compared to the chemical absorption of carbon dioxide in basic, in particular aminic, solvents a flash step requires no energy for removing the carbon dioxide from the absorption medium. This leads to a reduction in the operating costs of the plant (OPEX). Capital costs are also reduced simultaneously since fewer plant components such as hot regeneration columns, heat exchangers for laden/regenerated solvent and boilers are required.

The absorption of carbon dioxide in the physical absorption medium according to step (d) is performed at elevated pressure. The absorption step (d) is in particular performed at an absolute pressure of 10 to 100 bar, preferably at 20 to 60 bar. A resulting high carbon dioxide partial pressure (absorption under high pressure) favours physical absorption by the absorption medium whereas the absorption capacity in a chemical absorption depends solely on the amount or concentration of the absorption medium provided. In an absorption by chemical absorption media the absorption capacity thus cannot be enhanced by increasing the pressure.

To improve the absorption capacity of the absorption medium the absorption medium is cooled according to step (c) in addition to the synthesis gas to be treated. The target temperature during cooling of the absorption medium depends on the physical properties of the absorption medium, such as for example the melting point,
the temperature dependence on the viscosity and
the dependence of the carbon dioxide absorption capacity on the temperature.

If for example N-methyl-2-pyrrolidone (NMP) is used as the absorption medium, this is cooled to a temperature of not less than 0° C. If for example methanol is used as the absorption medium, this is cooled to a temperature of preferably less than −30° C.

One embodiment of the process according to the invention is characterized in that the physical separation step comprises a pressure swing adsorption.

Step (f) preferably comprises a pressure swing adsorption step for removal of hydrogen from the synthesis gas at least partially freed of carbon dioxide. This affords hydrogen as pure product gas while the offgas of the pressure swing adsorption step comprises hydrogen, carbon monoxide, carbon dioxide and optionally further gas constituents such as methane and nitrogen. The pressure swing adsorption step is performed in an apparatus for pressure swing adsorption (PSA).

To be precise a pressure swing adsorption separates carbon monoxide and carbon dioxide and optionally further gas constituents from hydrogen. As a light component hydrogen does not bind or at least binds less strongly to the adsorbent of the fixed bed of a pressure swing adsorption apparatus. The other "heavy" gas constituents bind more strongly to the fixed bed and are thus separated from the hydrogen by continuing cyclic adsorption and desorption operations. At the end of each cycle the adsorbed components are removed from the adsorbent of the fixed bed of a pressure swing adsorption apparatus by pressure reduction and discharged from the pressure swing adsorption apparatus as offgas.

One embodiment of the process according to the invention is characterized in that offgas obtained in step (f) and carbon monoxide and hydrogen obtained in step (e) are in a common gas compressor compressed to absorption pressure and recycled to step (d).

The utilization of a common gas compressor for recompression to absorption pressure makes it possible to achieve a process mode which minimizes operating costs (OPEX) and capital costs (CAPEX).

One embodiment of the process according to the invention is characterized in that offgas obtained in step (f) is partly utilized as fuel in the production of the synthesis gas.

If according to step (g) only a sub-amount of the offgas is recycled to step (d) rather than the total amount, the remaining portion may be utilized as fuel in the production of the synthesis gas. This comprises utilization as fuel gas, for example for a burner in synthesis gas production by SMR or ATR. This further comprises utilization as fuel gas within a fired heating unit in which the combustion gases of the fuel are utilized as a medium for heating process streams.

Utilization of the offgas as fuel allows for a flexibilization of the process. The amount of the offgas diverted as fuel may be varied depending on the amount of fuel required within a plant complex at a particular juncture. This makes it possible for example to compensate variations in fuel supply.

One embodiment of the process according to the invention is characterized in that offgas obtained in step (f) is subjected to a further absorption step with cooled absorption medium, wherein an offgas at least partially freed of carbon dioxide and a further absorption medium laden with carbon dioxide and partially co-absorbed carbon monoxide and hydrogen are obtained, and the offgas partially freed of carbon dioxide is compressed to absorption pressure and recycled to step (d).

The efficiency of the process is further improved by an additional absorption step for the offgas, i.e. based on a defined time interval larger volume flows of synthesis gas may be treated, thus increasing the yield of hydrogen as product gas and the yield of carbon dioxide discharged from the process according to step (h) (carbon dioxide product).

The further absorption medium laden with carbon dioxide and partially co-absorbed carbon monoxide and hydrogen is preferably treated in the plurality of serially arranged flash stages according to step (e).

This further increases the abovementioned efficiency of the process in terms of synthesis gas throughput.

One embodiment of the process according to the invention is characterized in that the synthesis gas is in a process step upstream of the process subjected to a water gas shift reaction to increase the hydrogen yield, thus enriching the synthesis gas with water and carbon dioxide.

One embodiment of the process according to the invention is thus characterized in that the synthesis gas comprises water ($H_2O$) as a further component.

This water is preferably at least partially removed from the synthesis gas by cooling the synthesis gas below the dew point of water and separating the condensed water.

The majority of the water present in the synthesis gas, especially in the case of a shifted synthesis gas, is preferably removed by condensation. The removal of this water by cooling below the dew point and condensation is preferably effected before step (d), i.e. before commencement of the separation of the carbon dioxide from the remaining gas constituents of the synthesis gas. Since no water is required as process medium in the course of the further process, only relatively small amounts of water subsequently require removal from the process.

One embodiment of the process according to the invention is characterized in that the physical absorption medium is hygroscopic.

If a hygroscopic absorption medium is used as the physical absorption medium, water not removed by the abovementioned condensation is bound to the absorption medium, i.e. dissolved therein. This means the absorption medium may become enriched with water over a longer period, thus causing the absorption capacity of the absorption medium to fall. This accumulated water is therefore preferably separated from the absorption medium by a distillation step, for example a distillation or rectification.

The distillation step is preferably downstream of step (e), i.e. the water is removed from the absorption medium once the majority of the absorbed gas constituents have been removed from the absorption medium by the serially arranged flash stages according to step (e).

One embodiment of the process according to the invention is therefore characterized in that water is removed from the absorption medium in a distillation step arranged downstream of step (e).

In one embodiment the water separated by condensation is also sent to the distillation step and removed together with water that has accumulated in the absorption medium. The entire thermal separation of water and absorption medium in the distillation step therefore requires only a single apparatus, for example a rectification column, for the process.

One embodiment of the process according to the invention is characterized in that the distillation step for removal of water is operated temporarily, in particular temporarily as a consequence of exceedance of a threshold concentration of water in the absorption medium.

This measure makes it possible to save further energy. Since water accumulates in the absorption medium over time only slowly and the absorption capacity thus falls only slowly, it may be sufficient to operate the distillation step for removal of water only temporarily. "Temporarily" is to be understood as meaning that the distillation step is performed at certain times during performance of the process and not performed at certain other times. The latter is possible for example through a corresponding bypass arrangement of conduits and further components.

One embodiment of the process according to the invention is characterized in that absorption medium vapours obtained in the distillation step are utilized as a stripping medium for removal of carbon dioxide in the downstream flash stage according to step (e).

The distillation step for separation of water from the absorption medium arranged downstream of step (e) generates absorption medium vapours. In one embodiment these absorption medium vapours are generated as top product, for example when the absorption medium has a lower boiling point than water. Instead of condensing these absorption medium vapours and recycling them to step (d) as liquid absorption medium, said vapours are in this embodiment utilized as stripping medium for removal of the carbon dioxide in the downstream flash stage according to step (e). This makes it possible to further increase the amount of separated carbon dioxide without any additional energy requirements. Contrary to expectations it was further found that the hot absorption medium vapours do not reduce the efficiency of the overall process which is fundamentally configured for absorption of carbon dioxide in a cold or cryogenic absorption medium. In particular the overall performance of the plant in terms of refrigeration balance (refrigeration power and cooling water) is not adversely affected. It is a further advantage that the absorption medium vapours obtained in the distillation step are chemically identical to the absorption medium. Accordingly, no "foreign" stripping medium requiring subsequent removal from the stripped gas is introduced into the absorption medium.

In the context of the present invention a stripping medium is to be understood as meaning a medium which is incorporated, for example introduced, into the laden absorption medium during a flash step and displaces gas constituents, preferably carbon dioxide, bound to the absorption medium from the absorption medium.

The absorption medium vapours are utilized as stripping medium in the sense that the absorption medium vapours are incorporated, in particular introduced, into the laden absorption medium. The laden absorption medium is not heated to its boiling point or boiling temperature. In one embodiment the laden absorption medium is heated to a temperature at least 10 K below the boiling temperature of the absorption medium or to a temperature at least 15 K below the boiling temperature of the absorption medium or to a temperature at least 20 K below the boiling temperature of the absorption medium.

In addition or alternatively to the utilization of the absorption medium vapours as stripping medium, the laden absorption medium may before or during treatment in the plurality of serially arranged flash stages be heated by an internal and/or external energy source. The internal and/or external energy source is independent of the absorption media vapours as an energy source, i.e. the absorption medium vapours comprise no energy from the internal and/or external energy source. In particular the laden absorption medium is heated by heat exchange with a hot internal or external process medium. This makes it possible to further increase the amount of carbon monoxide, hydrogen and carbon dioxide removed from the laden absorption medium by step (e).

In one embodiment the laden absorption medium is heated by the internal and/or external energy source exclusively before or during the downstream flash stage. Since carbon monoxide and hydrogen bind only weakly to many absorption media, in particular methanol, a heating of the at least first flash stage via an internal and/or external energy source is not mandatory.

In an alternative embodiment for utilizing the absorption medium vapours as stripping medium, absorption medium vapours obtained in the distillation step are condensed and the condensed absorption medium is subsequently reused in the absorption step according to step (d).

One embodiment of the process according to the invention is characterized in that compression heat obtained in step (g) is utilized for direct or indirect heating of the absorption medium in the distillation step.

The compression heat generated for compressing the offgas obtained in step (f) and for compressing the carbon monoxide and hydrogen obtained in step (e) is advantageously utilized for direct or indirect heating of the absorption medium in the distillation step. For example a rectification column may be at least partially heated directly with the waste heat from a compressor, or the waste heat is utilized for generating steam which heats the rectification column. This improves the thermal integration of the process.

In another embodiment the compression heat obtained in step (g) is utilized to heat the laden absorption medium during treatment of the laden absorption medium in the plurality of serially arranged flash stages according to step (e). In particular the laden absorption medium in the flash stage arranged downstream of the at least first flash stage is heated by the abovementioned compression heat to facilitate desorption of the carbon dioxide in the downstream flash stage.

One embodiment of the process according to the invention is characterized in that the downstream flash stage has a lower pressure compared to the first flash stage.

In one embodiment the first flash stage for removal of co-absorbed carbon monoxide and hydrogen has a pressure of 10 to 25 bar, preferably of 15 to 20 bar, particularly preferably of 18 bar. In one embodiment step (e) comprises a second flash stage for removal of co-absorbed carbon monoxide and hydrogen. In one embodiment the second flash stage has a pressure of 5 to 12 bar, preferably of 6 to 10 bar, particularly preferably of 8 bar. In one embodiment the downstream flash stage has a pressure of 1 to 2 bar, preferably of 1.1 to 1.5 bar, particularly preferably of 1.3 bar. In one embodiment the downstream flash stage has a pressure below atmospheric pressure, for example a pressure of 0.1 to 1 bar. Subatmospheric pressure in the downstream flash stage allows the amount of separated carbon dioxide to be further increased.

One embodiment of the process according to the invention is characterized in that absorption medium obtained in the downstream flash stage according to step (e) is recycled to the physical absorption step according to step (d) for reabsorption of carbon monoxide.

In one embodiment of the process according to the invention the provided physical absorption medium comprises methanol or the physical absorption medium consists substantially of methanol or the physical absorption medium consists of methanol. The physical absorption medium preferably comprises at least 90% by volume of methanol or at least 95% by volume of methanol or at least 99% by volume of methanol or at least 99.5% by volume of methanol or at least 99.9% by volume of methanol. Methanol is a physical and hygroscopic absorption medium.

Methanol has the advantage that it has a very high absorption coefficient for carbon dioxide which increases with increasing pressure and decreasing temperature. It is miscible with water in any ratio and has a low viscosity even at very low temperatures. It may therefore be readily used as an absorption medium at temperatures of less than −30° C. (minus thirty degrees Celsius).

One embodiment of the process according to the invention is characterized in that the provided physical absorption medium comprises N-methyl-2-pyrrolidone (NMP) or consists substantially of NMP or consists of NMP. The physical absorption medium preferably comprises at least 90% by volume of NMP or at least 95% by volume of NMP or at least 99% by volume of NMP or at least 99.5% by volume of NMP. NMP is a physical and hygroscopic absorption medium.

One embodiment of the process according to the invention is characterized in that the synthesis gas comprises no sulfur compounds as impurities, in particular no hydrogen sulfide ($H_2S$) and/or no carbonyl sulfide (COS) as an impurity.

One embodiment of the process according to the invention is characterized in that the synthesis gas comprises no hydrogen cyanide (HCN) and/or no ammonia ($NH_3$) as an impurity.

The synthesis gas is preferably produced by steam reforming (SMR), partial oxidation (POX), autothermal reforming (ATR), gas-heated reforming (GHR) or combinations thereof of gaseous hydrocarbon-containing input materials, preferably natural gas. It is preferable when the carbon-containing input material has been subjected to a hydrodesulfurization. Thus produced synthesis gases contain none of the abovementioned sulfur compounds and/or nitrogen compounds distinct from molecular nitrogen ($N_2$) as impurities. In one embodiment the synthesis gas moreover comprises methane unreacted during synthesis gas production or other higher homologous hydrocarbons that have not been converted into synthesis gas.

One embodiment of the process according to the invention is characterized in that the process comprises no hot regeneration step for regenerating the laden absorption medium. Especially the abovementioned sulfur compounds, in particular hydrogen sulfide ($H_2S$), are typically removed by an energy-intensive hot regeneration step. Hydrogen sulfide has a high absorption coefficient relative to many absorption media, in particular methanol. The process according to the invention does not necessitate such a hot regeneration step. It is therefore particularly energy-saving and therefore has low operating costs (OPEX). Since a hot regeneration step necessitates a dedicated column, the capital costs (CAPEX) for the process according to the invention are also low.

In the context of the present invention "hot regeneration" is to be understood as meaning a process step comprising the desorption of absorbed gases with introduction of heat into the laden absorption medium, wherein the absorption medium is heated to boiling by introduction of heat. The abovementioned introduction of absorption medium vapours into the laden absorption medium is explicitly not to be understood as a hot regeneration since this merely heats the absorption medium to a temperature below its boiling temperature.

One embodiment of the process according to the invention is characterized in that the carbon dioxide is not subjected to a drying step after discharging from the process according to step (h).

The process according to the invention requires no drying step for the carbon dioxide discharged from the process according to step (h). The majority of water is removed from the synthesis gas preferably by cooling the synthesis gas below the dew point of water and condensation of the water. Water not removed by this step is preferably absorbed by a hygroscopic absorption medium and optionally removed from the absorption medium by distillation in a further step. In contrast to a process with chemical absorption in which water or an amine/water mixture is used as stripping medium, additional process water or additional process steam is not provided for.

One embodiment of the process according to the invention is characterized in that the carbon dioxide is not subjected to a condensation step, in particular is not subjected to a condensation step after discharging from the process according to step (h).

The process according to the invention does not necessitate an energy intensive and high apparatus complexity condensation step for carbon dioxide for separation thereof from the other gas constituents. The combination of the process steps according to the invention affords a pure and anhydrous (dry) carbon dioxide product without any need for a condensation step in respect of the carbon dioxide.

One embodiment of the process according to the invention is characterized in that, after discharging from the process according to step (h), the carbon dioxide is compressed and subsequently stored or sent to a further use. Before the carbon dioxide is sent for long-term storage it is typically compressed. This is often also necessary when the carbon dioxide is to be sent to a further use, for example for intermediate storage in pressurized tanks.

One embodiment of the process according to the invention is characterized in that an inert gas, in particular nitrogen ($N_2$), is utilized as stripping medium for removal of carbon dioxide in the downstream flash stage according to step (e).

This makes it possible to further increase the yield of separated carbon dioxide.

The invention further relates to a plant for producing hydrogen from synthesis gas. The plant further comprises means for separating carbon dioxide from this synthesis gas.

The objects of the invention are further at least partially achieved by a plant for producing hydrogen ($H_2$) and for separating carbon dioxide from synthesis gas, comprising the following plant components:
(a) means for providing synthesis gas, wherein the synthesis gas comprises at least hydrogen ($H_2$), carbon monoxide (CO) and carbon dioxide ($CO_2$);
(b) means for providing a physical absorption medium;
(c) means for cooling the synthesis gas and the absorption medium;
(d) an absorption column for running the cooled synthesis gas and the cooled absorption medium in counter-current at elevated pressure for removal of carbon dioxide from the synthesis gas, wherein synthesis gas at least partially freed of carbon dioxide is obtainable and absorption medium laden with carbon dioxide and partially co-absorbed carbon monoxide and hydrogen is obtainable;
(e) a plurality of serially arranged flash stages comprising a first flash stage for removal of the co-absorbed carbon monoxide and hydrogen from the laden absorption medium and comprising a flash stage arranged downstream of the first flash stage for removal of carbon dioxide from the laden absorption medium;
(f) an apparatus for separating hydrogen from the synthesis gas at least partially freed of carbon dioxide in a physical separation step, wherein hydrogen as product gas and an offgas comprising hydrogen, carbon monoxide and carbon dioxide are obtainable;
(g) a compressor for compressing the carbon monoxide and hydrogen obtainable in the first flash stage and the offgas obtainable in the apparatus (f) and for recycling the carbon monoxide and hydrogen obtainable in the first flash stage and the offgas obtainable in the apparatus (f) to the absorption column (d);
(h) means for discharging the product gas (hydrogen) obtainable in the apparatus (f) and the carbon dioxide obtainable in the downstream flash stage from the plant.

In one embodiment the compressor (g) is configured for compressing the carbon monoxide and hydrogen obtainable in the first flash stage and further for compressing the carbon monoxide and hydrogen obtainable in one or more further flash stages and the offgas obtainable in the apparatus (f); and configured for recycling the carbon monoxide and hydrogen obtainable in the first flash stage and further for recycling the carbon monoxide and hydrogen obtainable in one or more further flash stages and the offgas obtainable in the apparatus (f) to the absorption column (d).

One embodiment of the plant according to the invention is characterized in that the apparatus (f) comprises a unit for pressure swing adsorption.

One embodiment of the plant according to the invention is characterized in that the plant comprises a further absorption column for running the offgas obtainable in the apparatus (f) and cooled absorption medium in counter-current, wherein offgas at least partially freed of carbon dioxide is obtainable and a further absorption medium laden with carbon dioxide and partially co-absorbed carbon monoxide and hydrogen is obtainable.

The objects of the invention are further at least partially solved by a use of the process according to the invention or the plant according to the invention for separation of carbon dioxide from sulfur-free synthesis gas.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
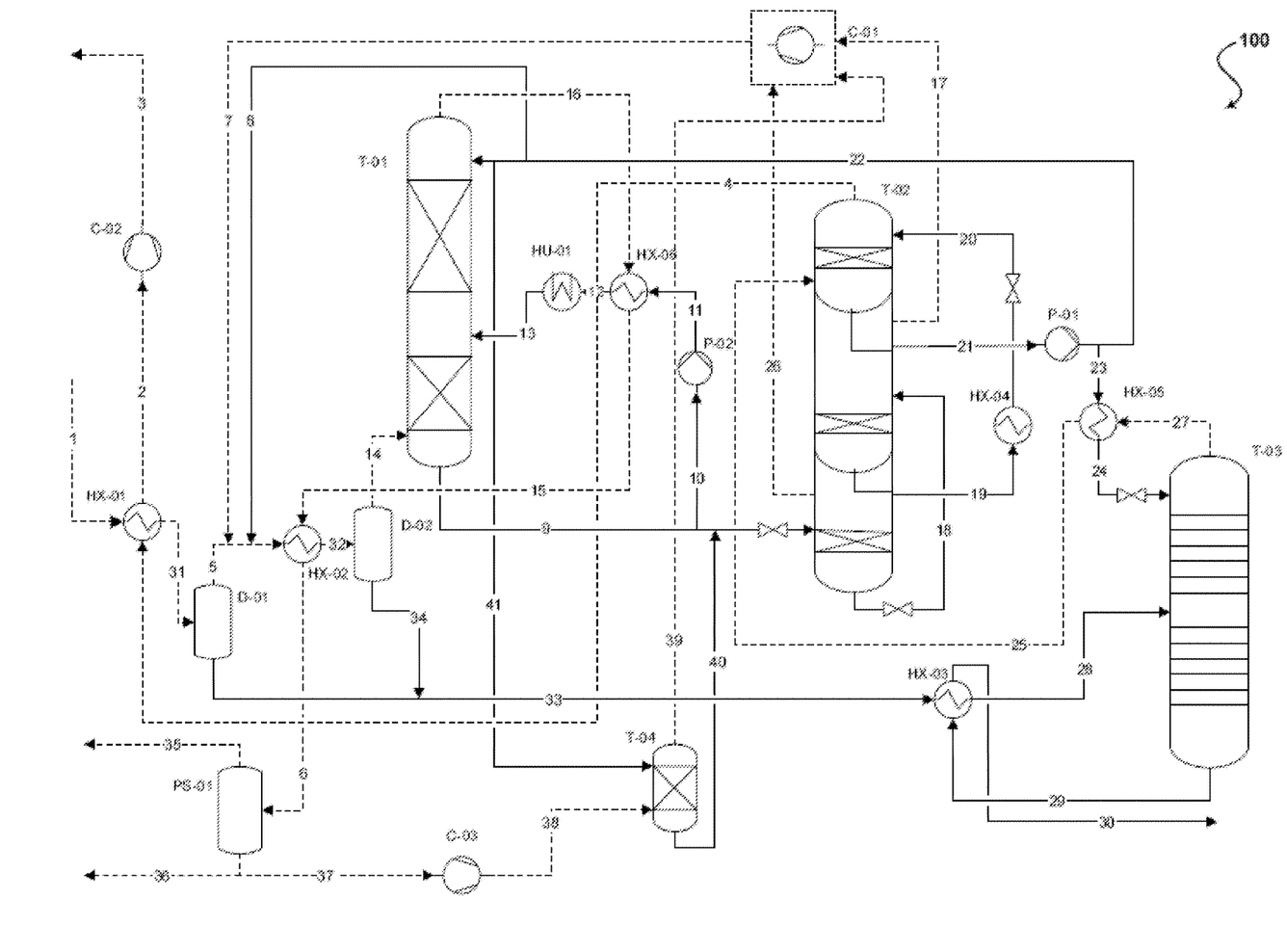
FIG. 1 illustrates a schematic representation of one embodiment of the present invention.

FIG. 1 shows a simplified process flow diagram of a possible embodiment of an inventive process 100 or an inventive plant 100. According to this embodiment the absorption medium is methanol. In the process flow diagram gas streams are represented by dashed lines and liquid streams are represented by solid lines. The flow direction of the respective stream is indicated by arrows.

Synthesis gas from a reformer unit (ATR, SMR, POx, GHR or combinations thereof) which was further treated in a water gas shift unit arranged downstream of the reformer unit (both not shown) is supplied via conduit 1 and initially cooled below the dew point of water in heat exchanger HX-01 using a carbon dioxide stream from conduit 4. The cooled synthesis gas is sent on via conduit 31 and condensed water is separated from the synthesis gas in separator D-01. Synthesis gas and uncondensed water is sent on via conduit 5 and in heat exchanger HX-02 further cooled to a temperature of −10° C. against purified synthesis gas from conduit 16. To prevent the formation of ice in conduit 5 methanol is supplied via conduit 8. Synthesis gas cooled to −10° C. in heat exchanger HX-02 is sent on via conduit 32 and in separator D-02 a further amount of water is separated from the synthesis gas and supplied via conduit 34 to the conduit 33.

The synthesis gas largely freed of water and cooled is sent on via conduit 14 and supplied to absorption column T-01 in which it is subjected to a physical absorption step. Absorption column T-01 is operated at an absorption pressure of 32 bar. In the absorption column T-01 cold methanol as absorption medium from the conduits 13 and 22 is passed from top to bottom while the synthesis gas from conduit 14 is run in counter-current from bottom to top, thus resulting primarily in absorption of carbon dioxide in methanol as well as co-absorption of relatively small amounts of value gases (carbon monoxide and hydrogen) in methanol. Any residual amounts of water not condensed in the separators D-01 and D-02 are simultaneously dissolved in methanol in the absorption column T-01. Purified synthesis gas, i.e. synthesis gas largely freed of water and carbon dioxide, is withdrawn from the absorption column T-01 via conduit 16. The synthesis gas subsequently cools a sub-amount of laden methanol diverted from conduit 9 using pump P-02 from conduit 10 and sent on via conduit 11 in heat exchanger HX-06. The purified synthesis gas is subsequently sent on via conduit 15 and in heat exchanger HX-02 cools the raw synthesis gas from conduit 5. The purified synthesis gas is subsequently sent via conduit 6 to a pressure swing adsorption unit PS-01 for producing pure hydrogen.

In the sump region of the absorption column T-01 laden methanol is withdrawn via conduit 9. The laden methanol contains carbon dioxide and in relatively small amounts co-absorbed value gases (carbon monoxide and hydrogen) as absorbed gas components. A portion of the laden methanol is diverted from conduit 9 via conduit 10 using pump P-02, sent on via conduit 11 and in heat exchanger HX-06 cooled against purified synthesis gas from conduit 16. It is subsequently sent on via conduit 12 and cooled to −35° C. in refrigerant cooler HU-01. The cooled laden methanol is subsequently sent on via conduit 13 and introduced into absorption column T-01 for reabsorption of carbon dioxide.

The majority of the laden methanol is introduced into the flash column T-02 via conduit 9. The pressure is initially reduced to 18 bar via the pressure reduction valve arranged in conduit 9. In the lower portion of the flash column this pressure reduction initially brings about in a first flash step liberation of essentially co-absorbed value gases (carbon monoxide and hydrogen) which are withdrawn via conduit 26 and sent to compressor C-01. Laden methanol decompressed to 18 bar is sent on via conduit 18 and decompressed to 8 bar via the pressure reduction valve arranged in conduit 18. In the middle portion of the flash column this further pressure reduction brings about in a second flash step further liberation of essentially co-absorbed value gases (carbon monoxide and hydrogen) which are withdrawn via conduit 17 and sent to compressor C-01. Compressor C-01 compresses the value gases from the conduits 17 and 26 to absorption pressure (32 bar). The compressed value gases are subsequently recycled into the absorption column T-01 via the conduits 7, 5, 32 and 14.

The methanol withdrawn from the second flash stage via conduit 19 is in heat exchanger HX-04 heated using a portion of the raw synthesis gas from conduit 1 (not shown) and via conduit 20 sent to a third flash stage in the upper portion of the flash column. The third flash stage is a flash stage arranged downstream of the first and second flash stage. Arranged in conduit 20 is a further pressure reduction valve which decompresses the laden methanol primarily still containing carbon dioxide as absorbed gas components to 1.3 bar.

The third flash stage is supplied via conduit 25 with methanol vapours from rectification column T-03 which are used as stripping medium in the third flash stage and increase the amount of the carbon monoxide expelled (desorbed) from the absorption medium in the third flash stage compared to a pure flash arrangement. The third flash stage may thus also be considered a stripping stage, wherein methanol vapours are used as stripping medium. The heating via heat exchanger HX-04 of the laden methanol supplied via conduit 20 also has a positive effect on the yield of the separated carbon dioxide. The carbon dioxide obtained from the third flash stage is withdrawn from this flash stage via conduit 4. It has a low temperature of −36° C. and is therefore utilized for cooling this raw synthesis gas from conduit 1 in heat exchanger HX-01. The carbon dioxide product is sent on via conduit 2 and compressed by compressor C-02. The compressed carbon dioxide may subsequently be stored (CCS) or sent to a further use (CCU).

The methanol obtained in the third flash stage comprises only a low residual content of absorbed carbon dioxide. It is withdrawn from the third flash stage via conduit 21 and compressed to absorption pressure (32 bar) using pump P-01. It is subsequently sent on via conduit 22 and supplied to the top region of the absorption column T-01 for reabsorption of carbon dioxide.

Since the absorption medium methanol is permanently recirculated and undergoes a large number of absorption and desorption cycles, it is over time enriched with water absorbed from the raw synthesis gas in the absorption column T-01. Therefore, a portion of the methanol largely freed of absorbed constituents is diverted from conduit 22 and via conduit 23 initially heated against hot methanol vapours from conduit 27 in heat exchanger HX-05. The amount of the methanol withdrawn via conduit 23 is adjusted such that water cannot accumulate in the methanol in the circuit between absorption column T-01 and the flash column, i.e. a predefined threshold concentration is not exceeded. It is subsequently sent via conduit 24 to an upper region of the rectification column T-03. Arranged in conduit 24 is a pressure reduction valve through which the methanol is decompressed to 2 bar. Water is also supplied to a middle region of the rectification column T-03. This is the water separated from the raw synthesis gas in the separators D-01 and D-02. This is supplied via conduit 33 and in heat exchanger HX-03 is heated against hot water exiting the rectification column T-03 as sump product via conduit 29. Rectification column T-03 is further heated with fresh steam via a boiler (not shown). Rectification column T-03 essentially performs a separation of methanol and water, wherein methanol vapours exit the rectification column T-03 as top product via conduit 27, are slightly cooled against methanol from conduit 23 in heat exchanger HX-05 and as mentioned above are introduced into the third flash stage as stripping medium via conduit 25.

In an alternative embodiment (not shown) the methanol vapours withdrawn from conduit 27 are completely condensed and the thus obtained condensed methanol is sent to conduit 22 for further introduction into the absorption column T-01.

Water is withdrawn from rectification column T-03 as sump product via conduit 29, cooled against water from conduit 33 and withdrawn from the process.

The synthesis gas discharged from the absorption column T-01 via conduit 16 and sent on via the conduits 15 and 16 after passage through heat exchangers HX-06 and HX-02 is sent to a pressure swing adsorption unit PS-01 for producing pure hydrogen. In the pressure swing adsorption unit PS-01 hydrogen 35 is separated from further synthesis gas constituents. Strictly speaking, the further gas constituents, for example carbon monoxide and carbon dioxide, are separated from the hydrogen, since hydrogen as a "light component" does not adsorb on the adsorbent of the fixed bed of the pressure swing adsorption unit PS-01. By contrast, the further gas constituents are separated from the hydrogen as "heavy components" by ongoing adsorption and desorption processes at the fixed bed.

The pressure swing adsorption unit PS-01 primarily separates carbon dioxide, carbon monoxide, nitrogen, methane and optionally further trace components from hydrogen by adsorption-desorption cycles, i.e. separates hydrogen therefrom. At the end of each cycle the adsorbed components are removed from the adsorbent of the fixed bed of the pressure swing adsorption unit PS-01 by pressure reduction, wherein the offgas is discharged from the corresponding vessel of the pressure swing adsorption unit PS-01. The offgas contains not only the abovementioned constituents to be separated from hydrogen but also significant amounts of hydrogen which has not been separated, i.e. was co-adsorbed on the fixed bed. The offgas is then divided into two substreams. A first portion is discharged from the process via conduit 36 and may be utilized for example as fuel for the production of the synthesis gas. The second substream is supplied to a compressor C-03 via conduit 37 and compressed from 1.2 bar to about 7.2 bar.

The compressed offgas may subsequently be sent to the value gas (hydrogen, carbon monoxide) obtained in the middle portion of the flash column T-02 in conduit 17 and together therewith compressed to absorption pressure (32 bar) in compressor C-01 (not shown). Compressor C-01 also compresses value gas (hydrogen, carbon monoxide) obtained in the first flash stage to absorption pressure (32 bar). In this embodiment the offgas from the pressure swing adsorption unit PS-01 is thus compressed to absorption pressure together with the desorbed value gases obtained in the first and second flash stage and sent to the absorption column T-01 for reabsorption.

In a further embodiment the offgas from conduit 38 is sent to a further absorption column T-04. Absorption column T-04 removes carbon dioxide from the offgas by counter-current absorption in methanol. Methanol is diverted from the regenerated methanol stream from conduit 22 and introduced through conduit 41 into the absorption column T-04. Carbon dioxide-laden absorption medium is discharged from the absorption column T-04 via conduit 40 and sent to the laden absorption medium in conduit 9. It thus then undergoes the same process steps as the laden absorption medium withdrawn from the absorption column T-01. The offgas largely freed of carbon dioxide in conduit 39 is supplied to compressor C-01 for common compression with the gases from conduits 17 and 26 to absorption pressure (32 bar). The use of an additional absorption step through absorption column T-04 further increases the total amount of carbon dioxide separated in the process.

The following table shows the advantages of the process according to the invention with partial recycling of the offgas discharged from the pressure swing adsorption unit PS-01, wherein the offgas in conduit 37 is after compression in compressor C-03 directly supplied to the flash gas in conduit 17.

In Example 1 no offgas from PS-01 is recycled, i.e. the offgas is entirely sent to a utilization as fuel for production of synthesis gas. In Example 2 50% by weight of the offgas is diverted and recycled via conduit 37; in Example 3 90% by weight of the offgas is diverted and recycled via conduit 37.

The data in the table apply to the production of 100 kNm³/h (thousand standard cubic metres per hour) of hydrogen which is subsequently compressed to a pressure of 30 bar. The data were generated by simulation with Aspen Plus (9) software.

| | Example 1 no offgas recycling | Example 2 50% by wt offgas recycling | Example 3 90% by wt offgas recycling |
| --- | --- | --- | --- |
| Proportion of separated carbon dioxide (CO₂ capture) | 83.75% | 91.13% | 98.07% |
| Purity of carbon dioxide | 98.80% | 98.80% | 98.40% |
| Hydrogen yield (H₂ recovery) | 87.73% | 93.45% | 98.52% |
| Hydrogen production/(Nm³/hr) | 100.168 | 100.168 | 100.168 |
| Cooling power/kW | 2.586 | 2.643 | 2.715 |
| Steam consumption/(t/h) | 0.77 | 0.73 | 0.69 |
| Process electrical power/kW (without CO₂ compression) | 1.783 | 3.662 | 6.422 |
| Cooling unit electrical power/kW | 1.378 | 1.409 | 1.447 |
| Total electrical power/kW | 3.161 | 5.071 | 7.869 |
| Cooling water/(t/h) | 10 | 154 | 369 |

The proportion of separated carbon dioxide is the proportion in percent of the theoretically separable carbon dioxide amount. The data show a significantly improved proportion of separated carbon dioxide when a portion of the off gas from the pressure swing adsorption unit is compressed and recycled to the absorption step as recycle gas. The proportion of separated carbon dioxide increases with the proportion of recycled offgas amount. At a recycle rate of 90% by weight more than 98% of the theoretically separable carbon dioxide is separated compared to less than 85% without recycling of the offgas. The carbon dioxide has a purity of at least 98%.

The following table shows a mass balance of the above Example 3 (90% by weight recycling of off gas from PS-01).

|  |  | Synthesis gas (conduit 1) | Synthesis gas (conduit 6) | Hydrogen (conduit 35) | Carbon dioxide (conduit 3) | Offgas (conduit 36, 37) | Recycled offgas (conduit 37) |
|---|---|---|---|---|---|---|---|
| Temperature | °C. | 40 | 20 | 20 | 40 | 20 | 20 |
| Pressure | bar | 32 | 30 | 30 | 20 | 1 | 1 |
| Quantity flow (mole flow) | kmol/hr | 7366 | 6544 | 5013 | 1707 | 1531 | 1378 |
| Mole fractions |  |  |  | mol/mol |  |  |  |
| Carbon dioxide ($CO_2$) |  | 0.233 | 0.054 | 0.000 | 0.984 | 0.230 | 0.230 |
| Hydrogen ($H_2$) |  | 0.691 | 0.870 | 1.000 | 0.004 | 0.447 | 0.447 |
| Nitrogen ($N_2$) |  | 0.003 | 0.025 | 0.000 | 0.001 | 0.108 | 0.108 |
| Carbon monoxide (CO) |  | 0.005 | 0.041 | 0.000 | 0.004 | 0.175 | 0.175 |
| Methane ($CH_4$) |  | 0.002 | 0.009 | 0.000 | 0.005 | 0.040 | 0.040 |
| Methanol ($CH_3OH$) |  | 0.000 | 0.000 | 0.000 | 0.002 | 0.001 | 0.001 |
| Water ($H_2O$) |  | 0.068 | 0.000 | 0.000 | 0.000 | 0.000 | 0.000 |

The mass balance shows that in addition to the abovementioned advantages (high rate of separated carbon dioxide) the inventive process also affords a carbon dioxide product which is dry, i.e. contains no water as an impurity, and has a high purity of 98.4 mol %. The carbon dioxide product is thus suitable for long-term storage (CCS) or may be sent to a further use without a further purification step. For example the thus obtained carbon dioxide product as a synthesis gas constituent alongside electrolysis hydrogen would be suitable for production of methanol.

A hydrogen product free from impurities is also obtained.

The mass balance further shows that the offgas discharged from the pressure swing absorption apparatus (PSA) (PSA offgas) has a surprisingly high hydrogen content and carbon dioxide content, thus making it worthwhile to recover the hydrogen present in the PSA offgas and making the carbon dioxide present in the PSA offgas available to the carbon dioxide separation.

Embodiments of the invention are described with reference to different types of subject-matter. In particular, certain embodiments are described with reference to process claims while other embodiments are described with reference to apparatus claims. However, it will be apparent to a person skilled in the art from the description hereinabove and hereinbelow that, unless otherwise stated, in addition to any combination of features belonging to one type of claim, any combination of features relating to different types of subject-matter or types of claim may also be contemplated. Features may be combined to achieve synergistic effects which go beyond simple summation of the technical features.

While the invention has been represented and described in detail in the drawing and the preceding description, such a representation and description shall be considered elucidatory or exemplary and non-limiting. The invention is not limited to the disclosed embodiments. Other variations of the disclosed embodiments may be understood and executed by those skilled in the art of the field of the claimed invention from a study of the drawing, the disclosure and the dependent claims.

LIST OF REFERENCE SYMBOLS

1 to 41 Conduit
HX-01 to HX-06 Heat exchanger
HU-01 Refrigerant cooler
D-01, D-02 Separator
T-01, T-04 Absorption column
T-02 Flash column
T-03 Rectification column
P-01, P-02 Pump
C-01 to C-03 Compressor
PS-01 Pressure swing adsorption unit (PSA)

What is claimed is:

1. A process for producing hydrogen and for separating carbon dioxide from synthesis gas, comprising:
   (a) providing a synthesis gas, wherein the synthesis gas comprises at least hydrogen, carbon monoxide and carbon dioxide;
   (b) providing a physical absorption medium;
   (c) cooling the synthesis gas and the absorption medium;
   (d) removing carbon dioxide from the cooled synthesis gas via the cooled absorption medium in a physical absorption step at elevated pressure, wherein the cooled synthesis gas and the cooled absorption medium are run in countercurrent, wherein synthesis gas at least partially freed of carbon dioxide is obtained and absorption medium laden with carbon dioxide and partially co-absorbed carbon monoxide and hydrogen is obtained;
   (e) treating the laden absorption medium in a plurality of serially arranged flash stages, wherein co-absorbed carbon monoxide and hydrogen are removed from the laden absorption medium in at least one first flash stage and carbon dioxide is removed from the laden absorption medium in a flash stage arranged downstream of the at least one first flash stage;
   (f) separating hydrogen from the synthesis gas at least partially freed of carbon dioxide in a physical separation step, wherein hydrogen as a product gas and an offgas comprising hydrogen, carbon monoxide and carbon dioxide are obtained;

(g) compressing to absorption pressure and at least partially recycling to step (d) the offgas obtained in step (f) and the carbon monoxide and hydrogen obtained in step (e); and (h) discharging the product gas (hydrogen) obtained in step (f) and the carbon dioxide obtained in step (e) from the process.

2. The process according to claim 1, wherein the physical separation step comprises a pressure swing adsorption.

3. The process according to claim 1, wherein the offgas obtained in step (f) and carbon monoxide and hydrogen obtained in step (e) are in a common gas compressor compressed in step (g) to absorption pressure and recycled to step (d).

4. The process according to claim 1, wherein the offgas obtained in step (f) is partly utilized as fuel in the production of the synthesis gas.

5. The process according to claim 1, wherein the offgas obtained in step (f) is subjected to a further absorption step with cooled absorption medium, wherein an offgas at least partially freed of carbon dioxide is obtained and a further absorption medium laden with carbon dioxide and partially co-absorbed carbon monoxide and hydrogen is obtained, and the offgas partially freed of carbon dioxide is compressed to absorption pressure and recycled to step (d).

6. The process according to claim 5, wherein the further absorption medium laden with carbon dioxide and partially co-absorbed carbon monoxide and hydrogen is treated in the plurality of serially arranged flash stages according to step (e).

7. The process according to claim 1, wherein the synthesis gas comprises water ($H_2O$) as a further component.

8. The process according to claim 7, wherein water is removed from the absorption medium in a distillation step arranged downstream of step (e).

9. The process according to claim 8, wherein absorption medium vapours obtained in the distillation step are utilized as a stripping medium for removal of carbon dioxide in the downstream flash stage according to step (e).

10. The process according to claim 8, wherein compression heat obtained in step (g) is utilized for direct or indirect heating of the absorption medium in the distillation step.

11. The process according to claim 7, wherein the water is at least partially removed from the synthesis gas by cooling the synthesis gas below the dew point of water and separating the condensed water.

12. The process according to claim 1, wherein compression heat obtained in step (g) is utilized to heat the laden absorption medium during treatment of the laden absorption medium in the plurality of serially arranged flash stages according to step (e).

13. The process according to claim 1, wherein the physical absorption medium is hygroscopic.

14. The process according to claim 1, wherein the physical absorption medium comprises methanol or consists substantially of methanol or consists of methanol.

15. The process according to claim 1, wherein the physical absorption medium comprises N-methyl-2-pyrrolidone (NMP) or consists substantially of NMP or consists of NMP.

16. The process according to claim 1, wherein the synthesis gas is in a process step upstream of the process subjected to a water gas shift reaction to increase the hydrogen yield, thus enriching the synthesis gas with water and carbon dioxide.

17. A plant for producing hydrogen and for separating carbon dioxide from synthesis gas, comprising the following plant components:

(a) a means for providing synthesis gas, wherein the synthesis gas comprises at least hydrogen, carbon monoxide and carbon dioxide;

(b) a means for providing a physical absorption medium;

(c) a means for cooling the synthesis gas and the absorption medium;

(d) an absorption column for running the cooled synthesis gas and the cooled absorption medium in countercurrent at elevated pressure for removal of carbon dioxide from the synthesis gas, wherein synthesis gas at least partially freed of carbon dioxide is obtainable and absorption medium laden with carbon dioxide and partially co-absorbed carbon monoxide and hydrogen is obtainable;

(e) a plurality of serially arranged flash stages comprising a first flash stage for removal of the co-absorbed carbon monoxide and hydrogen from the laden absorption medium and comprising a flash stage arranged downstream of the first flash stage for removal of carbon dioxide from the laden absorption medium;

(f) an apparatus for separating hydrogen from the synthesis gas at least partially freed of carbon dioxide in a physical separation step, wherein hydrogen as a product gas and an offgas comprising hydrogen, carbon monoxide and carbon dioxide are obtainable;

(g) a compressor for compressing the carbon monoxide and hydrogen obtainable in the first flash stage and the offgas obtainable in the apparatus (f) and for recycling the carbon monoxide and hydrogen obtainable in the first flash stage and the offgas obtainable in the apparatus (f) to the absorption column (d); and (h) a means for discharging the product gas (hydrogen) obtainable in the apparatus (f) and the carbon dioxide obtainable in the downstream flash stage from the plant.

18. The process according to claim 17, wherein the apparatus (f) comprises a unit for pressure swing adsorption.

19. The plant according to claim 17, wherein the plant comprises a further absorption column for running the offgas obtainable in the apparatus (f) and cooled absorption medium in countercurrent, wherein offgas at least partially freed of carbon dioxide is obtainable and a further absorption medium laden with carbon dioxide and partially co-absorbed carbon monoxide and hydrogen is obtainable.

* * * * *